No. 797,269. PATENTED AUG. 15, 1905.
C. DELP.
AUTOMOBILE.
APPLICATION FILED MAR. 6, 1905.
2 SHEETS—SHEET 2.
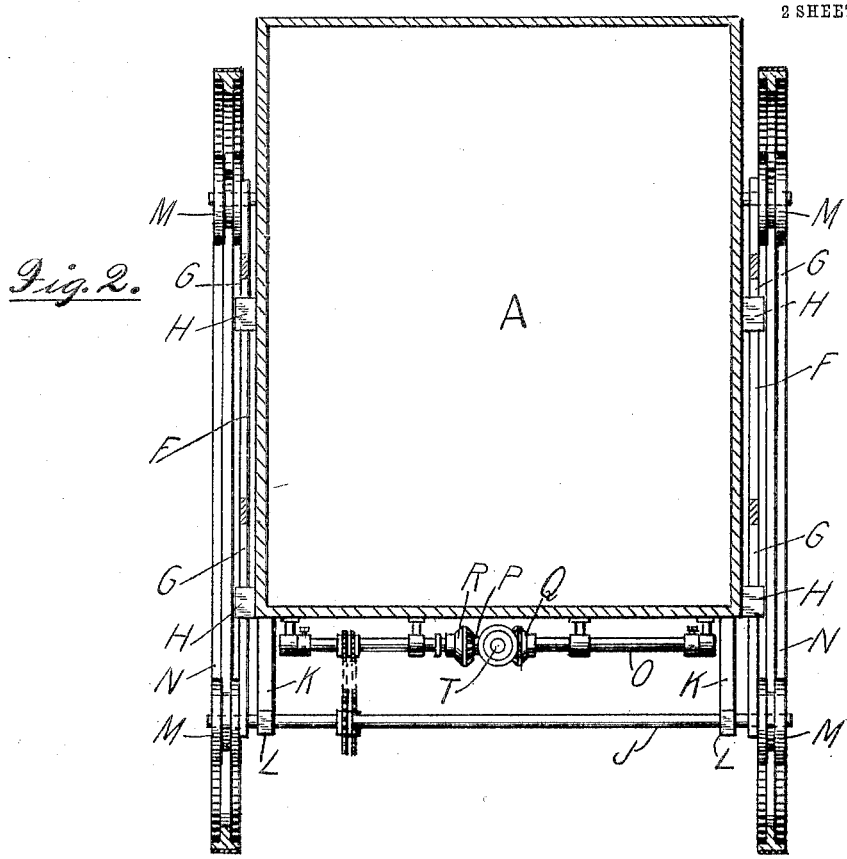
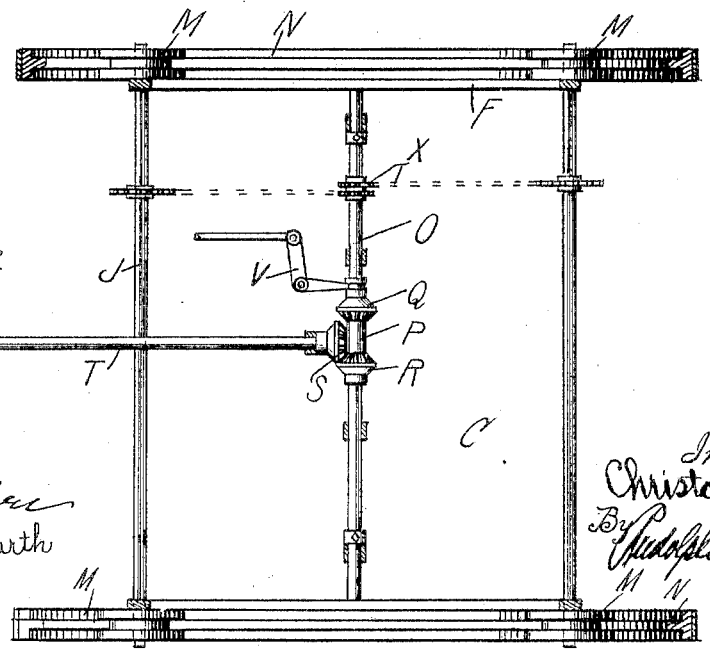
Witnesses
R. A. Fischer
E. Scherbarth
Inventor
Christoph Delp
By Rudolph Kew
Atty

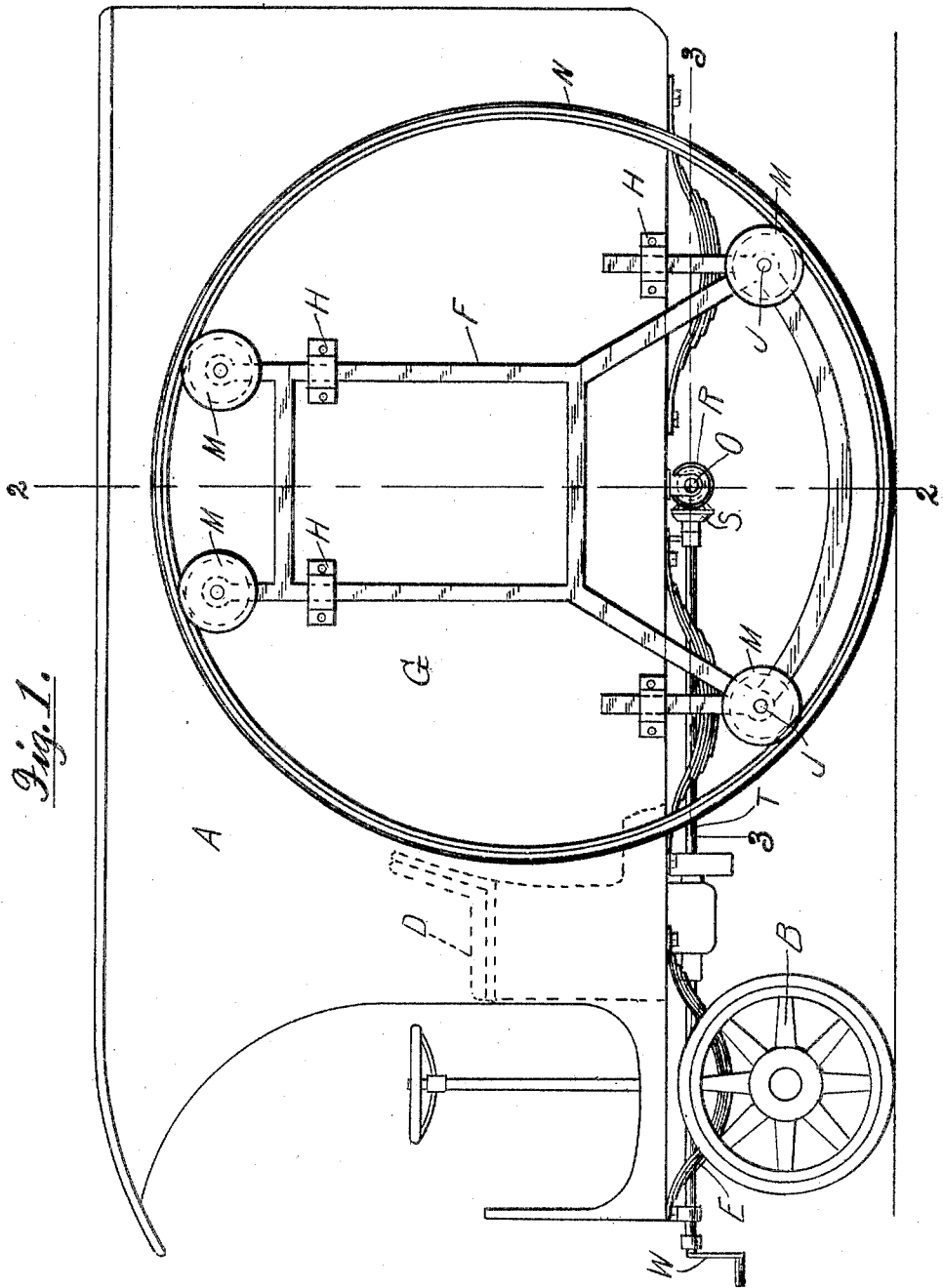

UNITED STATES PATENT OFFICE.

CHRISTOPH DELP, OF CLINTON JUNCTION, WISCONSIN.

AUTOMOBILE.

No. 797,269.        Specification of Letters Patent.        Patented Aug. 15, 1905.

Application filed March 6, 1905. Serial No. 248,695.

*To all whom it may concern:*

Be it known that I, CHRISTOPH DELP, a subject of the Emperor of Germany, residing at Clinton Junction, in the county of Rock and State of Wisconsin, have invented certain new and useful Improvements in Automobiles; and I do hereby declare the following to be a full, clear, and exact description of the invention, such as will enable others skilled in the art to which it appertains to make and use the same.

My invention relates to a novel construction in an automobile, the object being to provide a device of this character which is particularly adapted for commercial purposes to carry heavy loads over rough roads; and it consists in the features of construction and combinations of parts hereinafter fully described and claimed.

In the accompanying drawings, illustrating my invention, Figure 1 is a side elevation of an automobile constructed in accordance with my invention. Fig. 2 is a vertical transverse section of the same on the line 2 2 of Fig. 1. Fig. 3 is a horizontal section of the same on the line 3 3 of Fig. 1.

Referring now to said drawings, A indicates the box or body of an automobile constructed in accordance with my invention and which is supported on a front truck B and between its ends on a truck C, the said front truck B being pivotally movable and controlled by steering-gear of any suitable construction operated from the seat D, the wheels of said truck B being small to enable them to be turned to pass under said body A, which is supported sufficiently high to permit this by means of the springs E.

The truck C comprises two vertical frames F, disposed on opposite sides of the body A, said frames having vertical guide members G, adapted to move in bearings H, provided therefor on said body, said bearings being adapted to hold said frames against movement relatively to said body A in every direction except vertically. The said frames F are wider at their lower than at their upper ends and are provided in their lower ends with bearings for parallel horizontal shafts J, passing underneath said body A, the latter being yieldingly supported on said shafts by means of the spring K resting on journal-boxes L on said shafts. At their ends the said shafts J carry peripherally-grooved relatively small wheels M, which run upon the internally-disposed fellies of rims N of large diameter disposed on opposite sides of said body A from substantially movable or traveling tracks for said wheels M, the said fellies being adapted to fit said grooves in the latter. At the upper end of each frame F two of said wheels M are revolubly mounted, the latter forming idlers which serve to hold said rims N in proper relative position in an obvious manner. A horizontally-disposed shaft O is journaled in bearings on the body A substantially midway between said shafts J, and parallel therewith and on said shaft O a sleeve P is longitudinally movable, but is held against revolution relatively to said shaft in any suitable manner. Said sleeve P carries two bevel-gears Q and R, which are rigid therewith and are adapted to be alternately thrown to mesh with a bevel-gear S at the other end of the longitudinally-disposed drive-shaft T by imparting longitudinal movement to said sleeve P in any suitable manner—as, for instance, by the lever V, having a projection entering the peripheral groove in said sleeve P. The said drive-shaft T is driven by a suitable motor which may be conveniently disposed underneath the seat, the extreme forward end of said shaft T extending to the forward end of said body A and being adapted to receive a crank W, by means of which it may be turned to start a hydrocarbon-motor or impart movement to the vehicle, if desired. The said shaft O is geared to the shafts J by means of suitable sprocket-wheels and chains, as indicated at X. It will be noted that when the bevel-gear Q is thrown into mesh with the bevel-gear S the vehicle will be moved in one direction, and when said bevel-gear R is thrown into mesh with said bevel-gear S the vehicle will be moved in the opposite direction. The said rims N are driven by the frictional engagement of the lower wheels M therewith, and by reason of its large diameter it will obviously easily pass over the ordinary obstacles presented in roads where smaller wheels would prove inefficient, and said rims N may be made of a width to cover relatively large surface in passing over a road, thus preventing them from injuring such road when carrying excessive loads or sinking into mud in such roads to an extent sufficient to materially impede progress.

My said invention is very efficient for commercial purposes by reason of the above and further by reason of the fact that said truck C is so disposed between the ends of the body A as to cause it to carry substantially the entire load contained in the latter and relieving the front truck of the maximum part of the load ordinarily carried thereby. In this manner I not only prevent the vehicle from being hindered by obstacles which ordinarily would obstruct the forward truck, but likewise insure sufficient traction to promote uniform progress of the vehicle.

I claim as my invention—

1. An automobile comprising a body portion or box mounted upon two trucks, one of said trucks being disposed between the ends of said body portion and comprising two vertical frames disposed on opposite sides of said body and having a plurality of vertical guide members, bearings on said body in which said guide members are vertically movable, parallel shafts extending laterally underneath said body and journaled at their ends in said frames, peripherally-grooved wheels mounted on the ends of said shafts, peripherally-grooved idlers revolubly mounted on the upper ends of said frame, rims of large diameter having fellies adapted to enter said grooves of said wheels and idlers forming endless traveling tracks for the same, gearing between said shafts and a source of power, journal-boxes on said shafts between their ends, and springs supporting said body portion or box resting on said journal-boxes.

2. In an automobile, the combination with the body portion or box, of a truck supporting same between its ends, said truck comprising two rims of large diameter disposed on opposite sides of said body portion or box and having fellies adapted to form endless rails, two vertically-disposed frames disposed on opposite sides of said body portion or box and having vertical guide members, bearings on said body portion or box in which said guide members are vertically movable, parallel shafts journaled in the lower ends of said frame and extending laterally underneath said body portion or box, journal-boxes revolubly mounted on said shafts between their ends, springs mounted thereon and supporting said body portion or box, gearing between said shafts and a motor carried by said body portion or box, peripherally-grooved wheels on the ends of said shafts engaging the fellies of said wheels, and idlers on said frames engaging said fellies to hold same in proper relative position.

In testimony whereof I have signed my name in presence of two subscribing witnesses.

CHRISTOPH DELP.

Witnesses:
    RUDOLPH WM. LOTZ,
    E. SCHERBARTH.